(12) United States Patent
Zacharias et al.

(10) Patent No.: US 9,986,479 B2
(45) Date of Patent: May 29, 2018

(54) CARRIER PRIORITIZATION FOR TUNE-AWAY

(71) Applicant: QUALCOMM Incorporated, San Diego, CA (US)

(72) Inventors: Leena Zacharias, San Jose, CA (US); Aziz Gholmieh, Del Mar, CA (US); Thiagarajan Sivanadyan, Boulder, CO (US); Amit Mahajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/057,869

(22) Filed: Mar. 1, 2016

(65) Prior Publication Data
US 2017/0257807 A1 Sep. 7, 2017

(51) Int. Cl.
*H04W 4/00* (2018.01)
*H04W 36/00* (2009.01)
(Continued)

(52) U.S. Cl.
CPC ......... *H04W 36/14* (2013.01); *H04W 72/121* (2013.01); *H04W 76/16* (2018.02);
(Continued)

(58) Field of Classification Search
CPC ..... H04W 36/14; H04W 76/28; H04W 76/15; H04W 76/16; H04W 72/121; H04W 88/06; H04L 5/001
(Continued)

(56) References Cited

U.S. PATENT DOCUMENTS 8,320,291 B2 * 11/2012 Rune .................... H04J 11/0069
370/312
9,084,184 B2 7/2015 Chin et al.
(Continued)

FOREIGN PATENT DOCUMENTS

| WO | WO-2016/133618 A1 | 8/2016 |
| WO | WO-2016/133619 A1 | 8/2016 |
| WO | WO-2017/011976 A1 | 1/2017 |

OTHER PUBLICATIONS

International Search Report and Written Opinion—PCT/US2017/016377—ISA/EPO—Apr. 18, 2017. (14 total pages).

*Primary Examiner* — Thai Hoang
(74) *Attorney, Agent, or Firm* — Arent Fox, LLP

(57) ABSTRACT

Aspects of the present disclosure relate to performing a tune-away from a first radio access technology (RAT) to a second RAT. These techniques include, for example, a method in which one or more radio resources of a user equipment are tuned away from the first RAT (e.g., LTE technology) to the second RAT (e.g., legacy 2G/3G technology and/or Wi-Fi or Bluetooth technology). Based on detecting a need to tune away one or more radio resources, the UE may then determine a tune-away metric for each serving cell based on one or more performance impact factors associated with the serving cell being tuned away. The UE may select one or more of the cells to be tuned away based on the determined tune-away metrics. The UE may then tune one or more radio resources corresponding to the selected at least one cell away from the first RAT to the second RAT.

30 Claims, 8 Drawing Sheets

(51) Int. Cl.
*H04W 36/14* (2009.01)
*H04W 72/12* (2009.01)
*H04L 5/00* (2006.01)
*H04W 88/06* (2009.01)

(52) U.S. Cl.
CPC ............. *H04W 76/28* (2018.02); *H04L 5/001* (2013.01); *H04W 36/0088* (2013.01); *H04W 76/15* (2018.02); *H04W 88/06* (2013.01)

(58) Field of Classification Search
USPC .................................. 370/331–334, 465–469
See application file for complete search history.

(56) References Cited

U.S. PATENT DOCUMENTS

| | | | |
|---|---|---|---|
| 9,462,559 B2* | 10/2016 | Shen | H04W 52/242 |
| 9,743,459 B2* | 8/2017 | Shah | H04W 76/048 |
| 2013/0201850 A1* | 8/2013 | Swaminathan | H04W 72/1215 370/252 |
| 2013/0242897 A1 | 9/2013 | Meylan et al. | |
| 2013/0267267 A1* | 10/2013 | Mujtaba | H04W 36/0066 455/509 |
| 2013/0303168 A1 | 11/2013 | Aminzadeh Gohari et al. | |
| 2014/0003364 A1* | 1/2014 | Ramachandran | H04W 76/16 370/329 |
| 2015/0029980 A1 | 1/2015 | Boström et al. | |
| 2015/0085792 A1 | 3/2015 | Reddy et al. | |
| 2015/0092683 A1 | 4/2015 | Rangarajan et al. | |
| 2015/0131622 A1* | 5/2015 | Sahu | H04W 72/02 370/336 |
| 2015/0245250 A1 | 8/2015 | Bhattacharjee et al. | |
| 2015/0257057 A1* | 9/2015 | Su | H04W 56/0015 370/329 |
| 2015/0257199 A1* | 9/2015 | Su | H04W 76/048 455/552.1 |
| 2015/0282019 A1* | 10/2015 | Anand | H04W 36/04 455/437 |
| 2015/0334553 A1* | 11/2015 | Yang | H04L 1/1854 455/552.1 |
| 2015/0350934 A1* | 12/2015 | Yang | H04W 24/04 370/252 |
| 2016/0105835 A1* | 4/2016 | Chin | H04W 36/04 370/331 |
| 2016/0119836 A1* | 4/2016 | Yang | H04W 36/0072 455/437 |
| 2016/0302128 A1* | 10/2016 | Anchan | H04W 36/30 |
| 2016/0338009 A1* | 11/2016 | Yang | H04W 68/005 |
| 2016/0344572 A1* | 11/2016 | Brust | H04L 12/66 |
| 2017/0188407 A1* | 6/2017 | Zee | H04W 76/026 |

\* cited by examiner

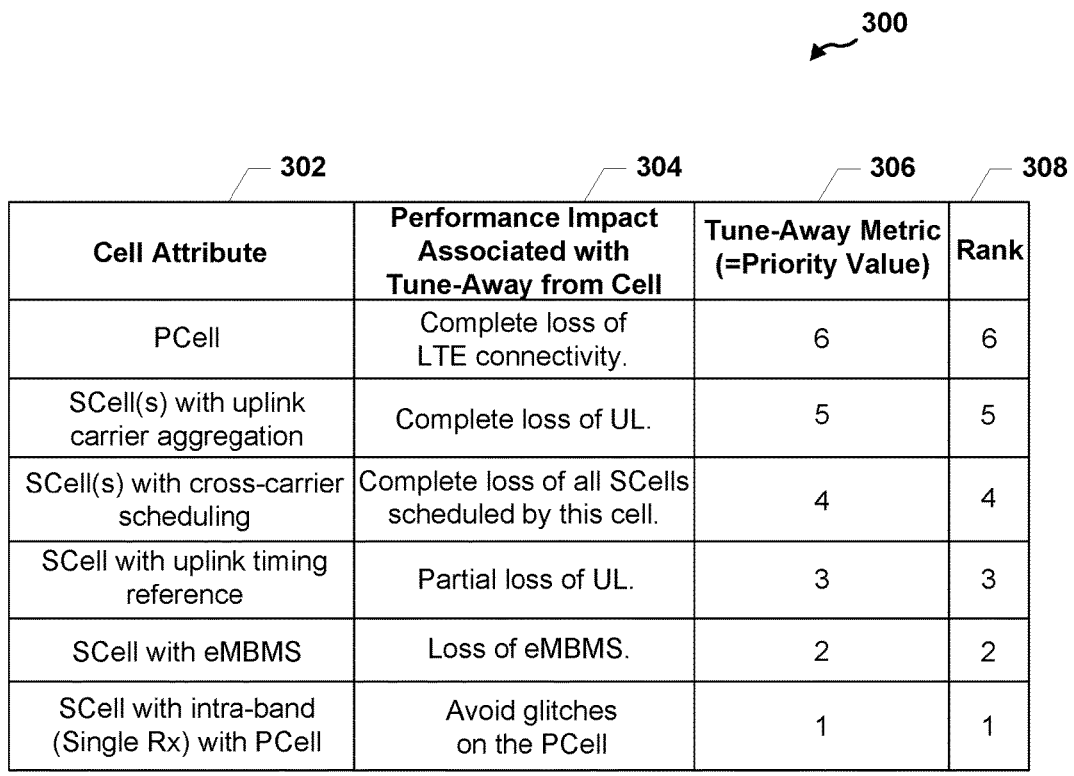

| Cell Attribute | Performance Impact Associated with Tune-Away from Cell | Tune-Away Metric (=Priority Value) | Rank |
|---|---|---|---|
| PCell | Complete loss of LTE connectivity. | 6 | 6 |
| SCell(s) with uplink carrier aggregation | Complete loss of UL. | 5 | 5 |
| SCell(s) with cross-carrier scheduling | Complete loss of all SCells scheduled by this cell. | 4 | 4 |
| SCell with uplink timing reference | Partial loss of UL. | 3 | 3 |
| SCell with eMBMS | Loss of eMBMS. | 2 | 2 |
| SCell with intra-band (Single Rx) with PCell | Avoid glitches on the PCell | 1 | 1 |

FIG. 3

| Serving Cell | Cell Attribute(s) | Tune-Away Metric (=Total Weight) | Rank |
|---|---|---|---|
| SCell1 | DL DCI of SCell1 scheduled by SCell1 | 2 | 2 |
| SCell2 | DL DCI of SCell2, SCell3, and SCell4 scheduled by SCell2 + UL DCI of SCell4 scheduled by SCell2 | 8 (2*3 + 2) | 4 |
| SCell3 | DL data of SCell3 | 1 | 1 |
| SCell4 | DL data of SCell4 + SCell4 is only cell in STAG | 3 (1 + 2) | 3 |

*FIG. 5A*

| | Serving Cell | Cell Attribute(s) | Tune-Away Metric (=Total Weight) | Rank |
|---|---|---|---|---|
| 608 | SCell1 | DL DCI of SCell1 scheduled by SCell1 + SCell1 and SCell4 are in STAG | 3 (2 + 1) | 3 |
| 610 | SCell2 | DL DCI of SCell2, SCell3, and SCell4 scheduled by SCell2 + UL DCI of SCell4 scheduled by SCell2 | 8 (2*3 + 2) | 4 |
| 612 | SCell3 | DL data of SCell3 | 1 | 1 |
| 614 | SCell4 | DL data of SCell4 + SCell1 and SCell4 are in STAG | 2 (1 + 1) | 2 |

*FIG. 6A*

CARRIER PRIORITIZATION FOR TUNE-AWAY

BACKGROUND

The present disclosure relates generally to wireless communication systems, and more particularly, to techniques for performing a tune-away on a wireless communication device based on carrier prioritization.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

LTE carrier aggregation (CA) enables user equipment (UE) to aggregate multiple downlink and uplink carriers using one or more shared radio frequency (RF) resources. A UE may include one or more subscriptions, such as in one or more subscriber identification modules (SIMs), used to connect to different radio access technologies (RATs). One consequence of the UE connecting to a plurality of RATs is that communications for the RATs may sometimes interfere with each other. For example, subscriptions to two RATs on a UE may utilize a shared RF resource (e.g., one or more antennas, one or more receive chain components, etc.) to communicate with each of their respective mobile telephony networks, but only one RAT may use the shared RF resource at a time. The RAT actively using the shared RF resource ("active RAT") may occasionally be forced to interrupt its RF operations so that the other RAT ("idle RAT") may use the shared RF resource to perform RF operations. This process of switching access of the shared RF resource is sometimes referred to as "tune-away," as the RF resource tunes away from a frequency band or channel of the active RAT to tune to a frequency band or channel of the idle RAT.

In a LTE carrier aggregation scenario, the shared RF resources support a primary component carrier (PCC) and one or more secondary component carriers (SCC). The PCC may include both an uplink carrier channel and a downlink carrier channel on a primary cell (PCell), and each of the SCCs may include a downlink carrier channel and additionally, may include an uplink carrier channel on secondary cells (SCells). During a tune-away, the UE or manager of the shared RF resource may select one or more of the SCells to tune away from in order to listen to the idle RAT. Currently, the selection of which SCell to tune-away does not consider the potential impact resulting from tuning away from the selected SCell. Rather, the selection is based on certain default rules. For example, currently, a SCell of an LTE subscription is tuned-away merely because it shares a transceiver with a legacy second-generation (2G) and/or third-generation (3G) subscription. This default tune-away procedure may result in the loss of a critical amount of scheduling information, timing reference, data, and/or broadcast and multicast service (eMBMS) carried by the tuned-away SCell, thereby inadvertently causing loss of LTE connectivity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure provides for a method of performing a tune-away from a first radio access technology (RAT) to a second RAT on a user equipment (UE) that includes detecting, by the UE, a need to tune away at least one of multiple radio resources utilized by the UE to communicate with multiple serving cells of the first RAT. The method further includes determining, for each of the multiple serving cells, a tune-away metric based on one or more performance impact factors associated with the serving cell being tuned away. In addition, the method includes selecting at least one serving cell of the multiple serving cells to be tuned away based on the determined tune-away metrics of each of the multiple serving cells. Furthermore, the method includes tuning one or more radio resources corresponding to the selected at least one serving cell away from the first RAT to the second RAT.

In accordance with another aspect, the present disclosure provides an apparatus (e.g., a UE) for performing a tune-away from a first radio access technology (RAT) to a second RAT, the apparatus including a memory configured to store instructions and one or more processors communicatively coupled to detect a need to tune away at least one of multiple radio resources utilized by the apparatus to communicate with multiple serving cells of the first RAT, to determine, for each of the multiple serving cells, a tune-away metric based on one or more performance impact factors associated with the serving cell being tuned away, to select at least one serving cell of the multiple serving cells to be tuned away based on the determined tune-away metrics of each of the multiple serving cells, and to tune one or more radio resources corresponding to the selected at least one serving cell away from the first RAT to the second RAT. A modem services component operating on the apparatus may be configured to perform the tune-away and one or more of the detecting, determining, selecting, and tuning operations associated with the apparatus.

In accordance with another aspect, the present disclosure provides an apparatus (e.g., a UE) for performing a tune-away from a first radio access technology (RAT) to a second radio access technology, the apparatus including means for detecting a need to tune away at least one of multiple radio resources utilized by the apparatus to communicate with multiple serving cells of the first RAT. The apparatus further including means for determining, for each of the multiple serving cells, a tune-away metric based on one or more performance impact factors associated with the serving cell being tuned away. In addition, the apparatus includes means for selecting at least one serving cell of the multiple serving cells to be tuned away based on the determined tune-away metrics of each of the multiple serving cells. Furthermore, the apparatus includes means for tuning one or more radio resources corresponding to the selected at least one serving cell away from the first RAT to the second RAT.

In accordance with yet another aspect, the present disclosure provides a computer-readable medium (e.g., a non-transitory medium) storing code executable by a computer for performing a tune-away from a first radio access technology (RAT) to a second RAT, the code including code for detecting a need to tune away at least one of multiple radio resources utilized by a user equipment to communicate with multiple serving cells of the first RAT. The computer-readable medium may further include code for determining, for each of the multiple serving cells, a tune-away metric based on one or more performance impact factors associated with the serving cell being tuned away. In addition, the computer-readable medium may include code for selecting at least one serving cell of the multiple serving cells to be tuned away based on the determined tune-away metrics of each of the multiple serving cells. Furthermore, the computer-readable medium may include code for tuning one or more radio resources corresponding to the selected at least one serving cell away from the first RAT to the second RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 3 is a table of an example of an aspect of one implementation of a priority ranking scheme that may be used by a user equipment to perform a tune-away from a first RAT to a second RAT in accordance with various aspects of the present disclosure.

FIG. 5A is a table of an example of selecting two serving cells for tune-away in accordance with aspects described herein.

FIG. 6A is a table of another example of selecting two serving cells for tune-away in accordance with aspects described herein.

DETAILED DESCRIPTION

Figure 1:
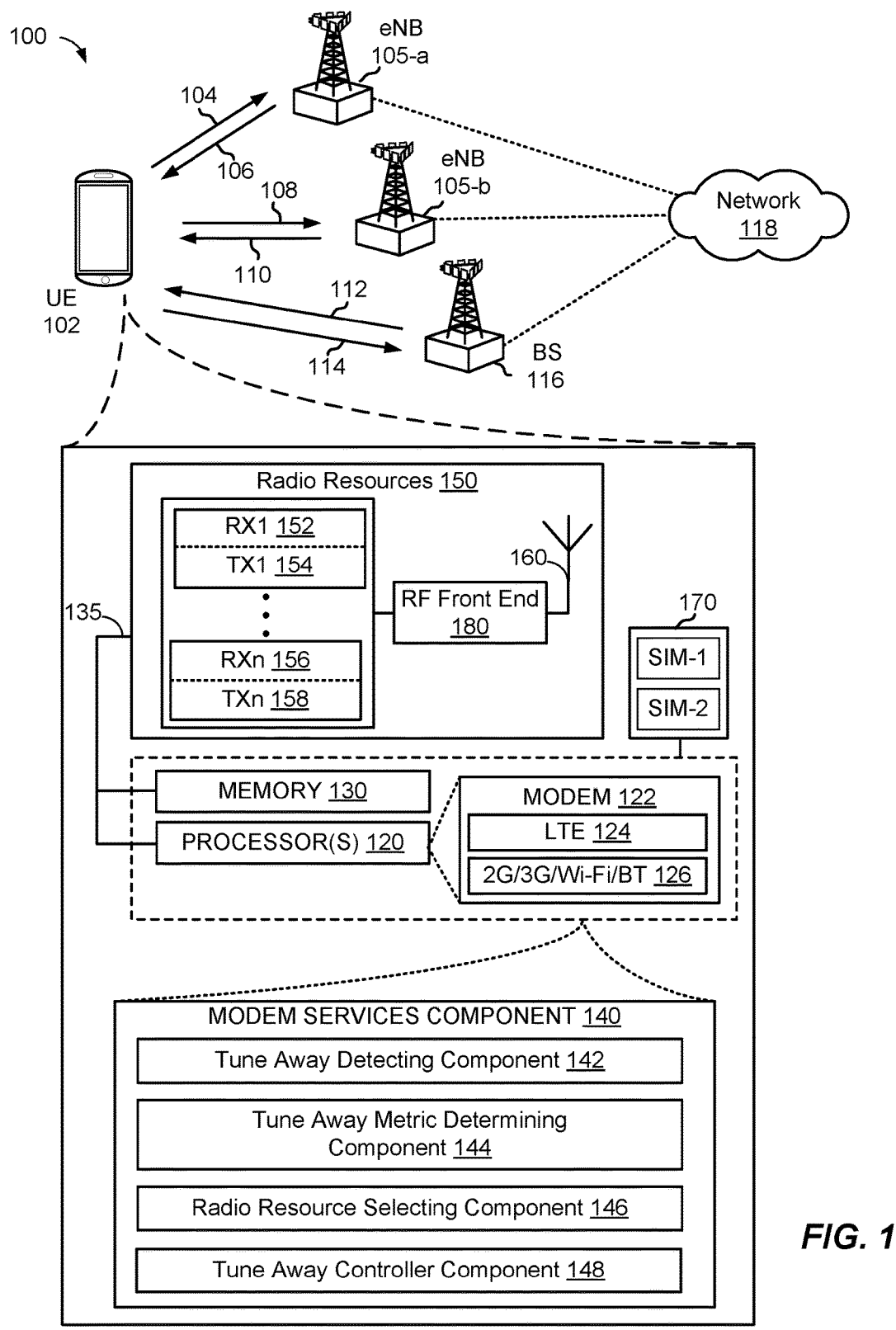
FIG. 1 is a schematic diagram illustrating features of a user equipment for performing a tune-away from a first RAT to a second RAT in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure relates to determining which one of a plurality of RF resources utilized by a UE to communicate with at least a first RAT, e.g., an LTE network, to tune away from the first RAT in order to communicate with a second RAT, e.g., a 2G, 3G, Wi-Fi, or Bluetooth network. For example, this determination may be made in the situation where all of the plurality of RF resources are being utilized to communicate with multiple serving cells of the first RAT. It should be noted, however, that the present aspects may also apply to the scenario where all of the plurality of RF resources of the UE are being utilized by more than one RAT when the need arises to communicate with yet another RAT. Moreover, the present aspect may be applied to other scenarios where a tune-away is desired when less than all of the plurality of RF resources are being utilized. In any case, currently, the selection of which RF resource to tune away from a serving cell does not consider the potential impact on the communication-related performance of the UE that may result from tuning an RF resource away from the selected serving cell.

The present disclosure describes various techniques that may be used by the UE to prioritize among the multiple serving cells of at least the first RAT and correspondingly select one of the plurality of RF resources to tune away from one or more serving cells of a first RAT in order to communicate with the second RAT. According to the present aspects, the multiple serving cells of at least the first RAT are prioritized and the corresponding RF resource is selected such that the tune-away will cause a least amount of impact on the communication-related performance of the UE, e.g., based on one or more performance impact factors determined to be associated with each cell. As such, the present aspects may provide carrier prioritization to achieve one or more goals during a tune-away, such as but not limited to maintaining connectivity (e.g., maintaining LTE connectivity while tuning away to another RAT), maximizing a RAT-specific throughput (e.g., maximizing LTE throughput while tuning away to another RAT), and/or alleviating thermal issues at the UE.

In an aspect, for example in a carrier aggregation scenario, the UE may detect a need to tune away one or more of multiple RF resources utilized by the UE to communicate with serving cells (e.g., a PCell and one or more SCells) of one or more evolved Node Bs (eNBs) in a LTE network. The UE may, based at least in part on detecting the need to tune away one or more RF resources, determine a tune-away metric for each of the serving cells. In an aspect, the UE may determine the tune-away metric for each serving cell based on one or more performance impact factors associated with tuning a RF resource away from the respective serving cell away. For example, in an aspect, the UE may use a priority scheme that provides a relative ranking between serving cells to determine the tune-away metrics of the serving cells. Alternatively, or additionally, the UE may use a weighting scheme that assigns weights to one or more performance impact factors that may be associated with each serving cell to determine the tune-away metrics of the serving cells. Further, in an aspect, the UE may rank (e.g., provide a value corresponding to a relative order) the serving cells according to the determined tune-away metrics of the serving cells. In yet another aspect, the UE may select one or more of the serving cells having a least amount of impact on communication-related performance according to the ranking, and tune one or more of the RF resources corresponding to the one or more selected cells away from an eNB of the LTE network to a base station (BS) of a legacy 2G/3G network or Wi-Fi or Bluetooth network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (see e.g., FIG. 1). Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Accordingly, in some aspects, the methods, apparatuses, and computer-readable medium described in the present disclosure may provide an efficient solution, as compared to current solutions, for selecting one or more RF resources of a UE to tune away from one or more serving cells of at least a first radio access technology (e.g., eNB in a LTE network) to a second radio access technology (e.g., BS in a legacy 2G/3G technology or Wi-Fi or Bluetooth technology).

Referring to FIG. 1, a system 100 for wireless communication, according to an example configuration, may include user equipment (UE) 102 that can communicate with different access points, such as an access point 105-*a* and an access point 105-*b* including an eNodeB (eNB) associated with a first RAT and an access point 116 including a base station (BS) associated with a second RAT. Each of access point 105-*a*, access point 105-*b*, and access point 116 may be communicatively coupled with, and provide UE 102 with access to, a network 118, such as but not limited to a core telecommunications network and/or the Internet. UE 102 may include a modem services component 140 configured according to prioritization or tune-away rules to prioritize among the multiple serving cells of at least the first RAT and correspondingly select one of the plurality of RF resources to tune away from one or more serving cells of a first RAT in order to communicate with a second RAT such that the tune-away will cause a least amount of impact on the communication-related performance of UE 102, as described in more detail below.

In accordance with the present disclosure, UE 102 may include at least one SIM card 170 having a subscription that allows UE 102 to communicate with at least one RAT. In an aspect, for example, UE 102 may include a first SIM (SIM-1) having a subscription associated with a first RAT (e.g., via access point 105 in a LTE network) and a second SIM (SIM-2) having a subscription associated with a second RAT (e.g., via access point 116 in a legacy 2G/3G network or Wi-Fi or Bluetooth network). Each SIM 170 and corresponding subscription information may identify and authenticate a subscriber using UE 102 to the first RAT and the second RAT, respectively. In some aspects, SIM-1 and/or SIM-2 may be configured with SIM information and/or Universal SIM applications, enabling access to GSM and/or UMTS networks. Alternatively, in a CDMA network, SIM-1 and/or SIM-2 may be a UICC removable user identity module (R-UIM) or a CDMA subscriber identity module (CSIM). Additionally, in some aspects, SIM 170 may be a removable card, while in other aspects, SIM 170 may be a hardware or software component fixed in or stored in a memory 130 of UE 102.

In an aspect, each access point 105 may provide UE 102 with an access to an LTE core network (e.g., an Evolved Packet Core), and access point 116 may provide UE 102 with an access point to a legacy 2G/3G access network, such as, but not limited to, GSM, CDMA2000, and W-CDMA, or to a Wi-Fi or Bluetooth network. In an aspect, when UE 102 communicates with access point 105-a, it may do so by transmitting uplink signals 104 and/or receiving downlink signals 106 over a first wireless communications link, which may include one or more carrier frequencies and/or frequency channels. Similarly, when UE 102 communicates with access point 105-b, it may do so by transmitting uplink signals 108 and/or receiving downlink signals 110 over a second communications link, which may one or more carrier frequencies and/or frequency channels. In an aspect, when UE 102 communicates with access point 116, it may do so by transmitting uplink signals 114 and/or receiving downlink signals 112 over a third communications link, which may include one or more carrier frequencies and/or frequency channels.

The wireless communications system 100 may support operation on multiple carrier frequencies (waveform signals of different frequencies), also referred to as carriers. Multi-carrier transmitters may transmit modulated signals simultaneously on the multiple carriers. For example, each communication link may be a multi-carrier signal modulated according to the various radio technologies described above. Each modulated signal may be sent on a different carrier and may carry control information (e.g., reference signals, control channels, etc.), overhead information, data, etc.

In this regard, UE 102 may be configured to communicate with one or more of access points 105 over multiple carriers using carrier aggregation (CA) (e.g., with one access point 105) and/or multiple connectivity (e.g., with multiple access points 105, such as with both of access point 105-a and access point 105-b). In either case, in an example, UE 102 may be configured with at least one PCell configured to support uplink and downlink communications between UE 102 and an access point 105. It is to be appreciated that there may be a PCell for each communication link between a UE 102 and a given access point 105. In addition, each of the communication links between a UE 102 and a given access point 105 may have one or more SCells that can support downlink communications and, in some cases, uplink communications. The PCell may carry system information, which may include configuration parameters for the SCells. Losing connection to the PCell may terminate UE's connection to its serving eNB, including communications with SCells. In some examples, an SCell may be used to communicate downlink data, downlink control information (DCI), a timing reference, and/or broadcast and multicast services (eMBMS), or any combination thereof, as described further herein. In certain aspects, an SCell may carry cross-carrier scheduling information for one or more other SCells. For example, a first SCell may carry downlink and/or uplink control information (DCI) for a second SCell to schedule data transmission on the second SCell. In order to perform data communication on the second SCell, a UE 102 may receive control information, such as, resource assignment, from the first SCell, instead from the second SCell.

In addition, for example, one or more of access points 105 may support carrier aggregation such that access points using different RATs (e.g., access point 116) may communicate to aggregate traffic from both access points (e.g., for a given UE 102). For example, UE 102 may communicate with access point 105-a, which may be an eNB in LTE, over a first connection, and access point 116, which may be a BS in a legacy 2G/3G network or a Wi-Fi or Bluetooth network, over a second connection. Access point 105-a may communicate with access point 116 (e.g., over a wired or wireless backhaul link 134) to schedule traffic for UE 102 between the access points 105-a/116 for communicating to the UE 102. Thus, in one example, UE 102 may support LTE and legacy 2G/3G communications or Wi-Fi or Bluetooth communications using one or more transceivers. In this regard, for example, carrier aggregation may be established for the UE 102 such that UE 102 receives data for a wireless network from access point 105-a and access point 116, which operate different RANs, using respective RATs. Access point 105-a may schedule and/or otherwise provide the data to access point 116 for communicating in the related wireless network. This configuration allows for increased throughput or other improved connectivity properties for the UE 102.

Moreover, UE 102 may be configured to collaboratively communicate with multiple access points 105 (e.g., eNBs) and 116 (e.g., BSs) through, for example, Multiple Input Multiple Output (MIMO), Coordinated Multi-Point (CoMP), or other schemes. MIMO techniques use multiple antennas on the access points and/or multiple antennas on the UE 102 to transmit multiple data streams. CoMP may include techniques for coordination of transmission and reception by a number of access points to improve overall transmission quality for UE 102 as well as increasing network and spectrum utilization.

In accordance with the present disclosure, UE 102 may include at least one memory 130, one or more processors 120, and one or more radio resources 150. Memory 130, one or more processors 120, and one or more radio resources 150 may communicate internally via a bus 135. In some examples, memory 130 and one or more processors 120 may be part of the same hardware component (e.g., may be part of a same board, module, or integrated circuit). Alternatively, memory 130 and one or more processors 120 may be separate components that may act in conjunction with one another. In some aspects, bus 135 may be a communication system that transfers data between multiple components and subcomponents of UE 102. In some examples, one or more processors 120 may include any one or combination of modem processor, baseband processor, digital signal processor, and/or transmit processor. Additionally or alternatively, one or more processors 120 may include modem services component 140 for carrying out one or more methods or procedures described herein. Modem services component 140 may comprise hardware, firmware, and/or software and may be configured to execute code or perform instructions stored in a memory (e.g., a computer-readable storage medium).

In an aspect, one or more processors 120 may include a modem 122, which may be configured to perform wireless communication operations. In one example, as shown in FIG. 1, modem 122 may include a first RAT or LTE portion 124 configured to handle LTE modem operations associated with SIM-1 and a second RAT or 2G/3G/Wi-Fi/Bluetooth portion 126 configured to handle, for example but not limited hereto, legacy 2G/3G modem operations associated with SIM-2 and/or Wi-Fi operations associated with a Wi-Fi network and/or Bluetooth operations associated with a Bluetooth network. In another example (not shown), one or more processors 120 may include separate modems for first RAT, e.g., LTE operations, and second RAT, e.g., legacy 2G/3G operations and/or Wi-Fi operations and/or Bluetooth operations. In an aspect, modem services component 140 may be implemented or included as part of modem 122.

In some examples, memory 130 may be configured for storing data used herein and/or local versions of applications or modem services component 140 and/or one or more of its subcomponents being executed by one or more processors 120. Memory 130 may include any type of computer-readable medium usable by a computer or a processor 120, such as random access memory (RAM), read only memory (ROM), tapes, magnetic discs, optical discs, volatile memory, non-volatile memory, and any combination thereof. In an aspect, for example, memory 130 may be a computer-readable storage medium (e.g., a non-transitory medium) that stores computer-executable code. The computer-executable code may define one or more operations or functions of modem services component 140 and/or one or more of its subcomponents, and/or data associated therewith. The computer-executable code may define these one or more operations or functions when UE 102 is operating the one or more processors 120 to execute modem services component 140 and/or one or more of its subcomponents to tune one or more radio resources 150 from a first RAT (e.g., access point 105 in a LTE network) to a second RAT (e.g., access point 116 in a legacy 2G/3G network or Wi-Fi or Bluetooth network).

In an aspect, radio resources 150 may include one or more receivers 152, 156 for receiving one or more data and control signals via one or more antenna(s) 160. Radio resources 150 may also include one or more transmitters 154, 158 for transmitting one or more data and control signals via antenna(s) 160. It is to be appreciated that radio resources 150 may include additional transmitters and/or receivers, and that each pair of transmitter and receiver may alternatively be implemented as a transceiver. The terms "radio resource," "transmitter," and/or "receiver," as used herein, may indicate an RF chain and/or portions of an RF chain in use for uplink and/or downlink communications. Such portions of the RF chain may include, without limitation, an RF front end 180, components of the RF front end 180, and/or antenna(s) 160. In an aspect, RF front end 180 may include one or more of switches, filter(s), low-noise amplifier(s), power amplifier(s), or voltage controlled oscillator(s) (not shown), and in some cases RF front end 180 may include sets of such components that correspond to each of the one or more transmitters (e.g., TX1 154 to TXn 158) and receivers (e.g., RX1 152 to RXn 156). Portions of the RF chain may be integrated into a single chip, or distributed over multiple chips.

Moreover, the radio resources 150 may comprise hardware, firmware, and/or software and may be configured to execute code or perform instructions stored in a memory (e.g., a computer-readable storage medium). In an aspect, one or more of the radio resources 150 may be configured to perform one or more of the tune-away operations described herein. For example, when a need to tune at least one radio resource 150 away from a first RAT to a second RAT is detected, at least one of a plurality of radio resources 150 (e.g., one of receiver RX1 152 and/or transmitter TX1 154, or one of receiver RXn 156 and/or transmitter TXn 158, where n may be any positive number) may be configured accordingly to change frequencies from a frequency or channel used for the first RAT to a frequency or channel used for the second RAT. It should be noted that while FIG. 1 represents radio resources 150 as including receiver RX1 152, transmitter TX1 154, RXn 156, and transmitter TXn 158, radio resources 150 may include any number of such resources. For example, in one carrier aggregation scenario, radio resources 150 may include up to 5 sets of receiver and transmitter resources, with one set being utilized for a primary component carrier (PCC) and up to 4 other sets being utilized by up to 4 secondary component carriers (SCC). It is to be appreciated that radio resources 150 may include any number of sets of receiver and transmitter resources including, for example, greater than 5 sets of receiver and transmitter resources.

According to the present aspects, modem services component 140 may include a tune away detecting component 142 to detect a need to tune away, a tune-away metric determining component 144 for prioritizing cells and corresponding ones of the radio resources 150 according to prioritization or tune-away rules, a radio resource selecting component 146 for selecting which one of the radio resources 150 to tune away based on the prioritization, and a tune-away controller component 148 for effecting the tune away.

More specifically, tune away detecting component 142 may be configured to detect a need to tune away one or more of multiple radio resources 150 utilized by UE 102 to communicate with multiple serving cells (e.g., PCell and one or more SCells) of a first RAT (e.g., access point 105-*a* in a LTE network) in order to communicate with a second RAT (e.g., access point 116 associated with a 2G/3G or Wi-Fi or Bluetooth network). For example, tune away detecting component 142 may identify a need to tune to the second RAT based on, but not limited to, for example, a scheduled time (e.g., a paging period) to listen for signals from the second RAT, and/or based on a thermal regulations (e.g., a thermal metric exceeding a thermal threshold), and/or to conserve battery power (e.g., when a remaining power level satisfies a remaining power threshold). Tune away detecting component 142 may be implemented as a hardware component separate from other hardware components in modem services component 140, or may be implemented as a combination of hardware and software using processors 120 and memory 130, or may be implemented as software or firmware executing or operating on processors 120 based on instructions stored on memory 130.

Further, and more specifically, tune away metric determining component 144 may be configured to determine, for each cell of the serving cells and according to prioritization or tune-away rules, a tune-away metric of such cell based on one or more performance impact factors associated with such cell being tuned away. For example, the one or more performance impact factors may include, but are not limited to, scheduling information loss, data loss, timing reference loss, and broadcast or multicast service loss, where each loss is due to a cell being tuned away. Further, for example, the tune-away metric may be a value associated with one or a combination of any performance impact factors associated with a cell, and/or a relative value or rank or prioritization of each cell (and, hence, the corresponding RF resource being used by the cell) in order to evaluate the impact of tuning away from each cell to listen to the second RAT. Tune away metric determining component 144 may be implemented as a hardware component separate from other hardware components in modem services component 140, or may be implemented as a combination of hardware and software using processors 120 and memory 130, or may be implemented as software or firmware executing or operating on processors 120 based on instructions stored on memory 130.

Also, more specifically, radio resource selecting component 146 may be configured to select, e.g., according to prioritization or tune-away rules, at least one cell of the serving cells to be tuned away based on the determined tune-away metric(s) of the serving cells. For example, in an aspect, radio resource selecting component 146 may compare a value associated with each tune-away metric and/or performance impact factor associated with each cell, or the relative ranking or priority/prioritization of each cell, and select the cell having the value, rank, or prioritization associated with a least impact on communications of UE 102 based on tuning away the radio resource 150 being used by the selected cell. Radio resource selecting component 146 may be implemented as a hardware component separate from other hardware components in modem services component 140, or may be implemented as a combination of hardware and software using processors 120 and memory 130, or may be implemented as software or firmware executing or operating on processors 120 based on instructions stored on memory 130.

Additionally, and more specifically, tune away controller component 148 may be configured to tune one or more radio resources 150 corresponding to the least one selected cell away from the first RAT to a second RAT (e.g., access point 116 in a legacy 2G/3G network or Wi-Fi or Bluetooth network). For example, in an aspect, tune away controller component 148 may reconfigure the respective one of the radio resources 150 associated with the selected cell in order to tune to the frequency, channel, or carrier of the second RAT. Tune away controller component 148 may be implemented as a hardware component separate from other hardware components in modem services component 140, or may be implemented as a combination of hardware and software using processors 120 and memory 130, or may be implemented as software or firmware executing or operating on processors 120 based on instructions stored on memory 130.

It is to be understood that various techniques described herein make reference to tuning a radio resource away from a serving cell of an eNB in a LTE network to cell of a BS in a legacy 2G/3G network or Wi-Fi or Bluetooth network. However, the various techniques described herein may be extended to EV-DO, Ultra Mobile Broadband (UMB), WCDMA, GSM, Evolved UTRA (E-UTRA), Institute of Electrical and Electronics Engineers (IEEE) 802.11 (Wi-Fi), IEEE 802.16 (WiMAX), IEEE 802.20, Flash-OFDM employing OFDM access (OFDMA), Bluetooth, Zigbee, or any other set of at least two different radio access technology networks. That is, whereas in this example LTE technology may be a first RAT, other RATs may also be used as the first RAT and, similarly, whereas legacy 2G/3G network technology or Wi-Fi or Bluetooth technology may be a second RAT, other RATs may also be used as the second RAT.

Figure 2:
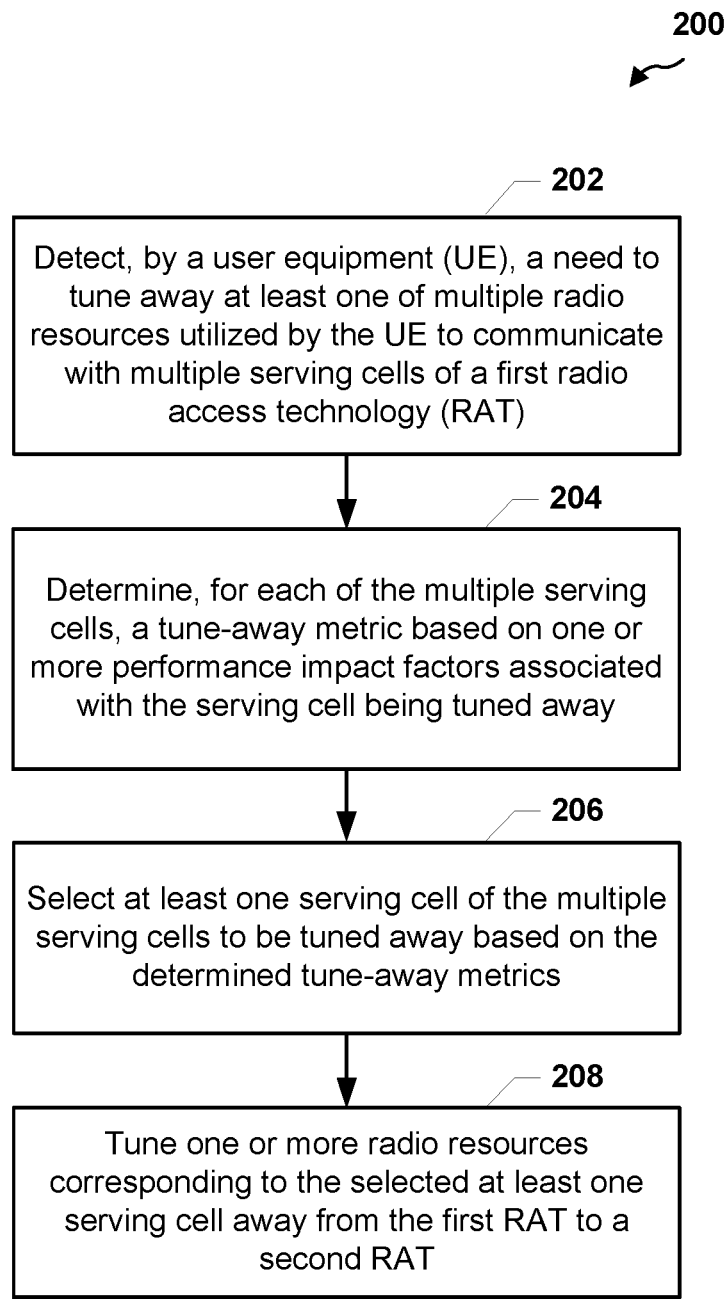
FIG. 2 is a flow diagram illustrating an example method of performing a tune-away from a first RAT to a second RAT on a user equipment in accordance with various aspects of the present disclosure.

Referring to FIG. 2, examples of one or more operations of UE 102 and/or modem services component 140 (FIG. 1) according to the present apparatus, methods, and computer-readable medium are described with reference to one or more methods and one or more elements or components that may perform the actions of the methods. It is to be understood that UE 102 and/or modem services component 140 may be implemented using memory 130 and/or processor(s) 120, the latter of which may include modem 122. In an aspect, at least a portion of modem services component 140 may be implemented as part of modem 122. Although the operations described below are presented in a particular order and/or as being performed by an example element or component, it should be understood that the ordering of the actions and the elements or components performing the actions may be varied, depending on the implementation.

Also, although modem services component 140 is illustrated as having a number of subcomponents, it should be understood that one or more of the illustrated subcomponents may be separate from, but in communication with, modem services component 140 and/or each other. Additionally, it should be understood that the following actions or components described with respect to the modem services component 140 and/or its subcomponents may be performed by a specially-programmed processor, a processor executing specially-programmed software or computer-readable media or by any other combination of a hardware and/or a software component specially configured for performing the described actions or components. Moreover, each of the following actions or components may be implemented by a respective means, which has a corresponding hardware component as illustrated in connection with FIG. 1.

In an aspect, method 200 may include, at Block 202, detecting a need to tune away at least one of multiple radio resources utilized by a UE to communicate with multiple serving cells of a first RAT. In one scenario, the UE may receive a request to communicate with a second RAT, but all of its radio resources are being used for the first RAT. In this case, a need is detected to tune away some of the radio resources to serve the second RAT. In an aspect, the UE may determine the number of radio resources that need to be tuned away from the first RAT based on a use case of the second RAT for which the tune away is needed. Prior to the detecting, all of the radio resources 150 may be tuned to serving cells of an access point 105 in a LTE network and, optionally, to serving cells of another cellular technology. As such, when a need to tune to the second RAT is identified, the result is that a radio resource currently in use to support communications with one of the multiple serving cells needs to be tuned away in order to communicate with the second RAT. In an aspect, for example, tune away detecting component 142 (e.g., in conjunction with memory 130 and/or processor(s) 120) may detect a need to tune away at least one radio resource 150 utilized by UE 102 to communicate with serving cells (e.g., PCell and one or more SCells) of access point 105-*a*. In an aspect, tune away detecting component 142 may detect a time interval or time instant that one or more of the radio resources 150 should be tuned away from access point 105-*a* to a second RAT (e.g., access point 116 in a legacy 2G/3G network or Wi-Fi or Bluetooth network). For example, the tune away detecting component 142 may detect that the one or more radio resources 150 should be tuned away from at least one serving cell of access point 105-*a* to a cell of access point 116 to allow the UE 102 to perform a time bounded activity (e.g., listen for a paging signal) during the time interval or an unbounded activity (e.g., originate or receive a voice call) at the time instant. In an additional (or alternative) aspect, tune away detecting component 142 may determine that the one or more radio resources 150 should be tuned away from at least one serving cell of access point 105-*a* to a cell of access point 116 to satisfy thermal regulations (e.g., a measured thermal metric is determined to exceed a corresponding thermal threshold that triggers tuning away the corresponding RF resource, such as a high transmit power communication with an eNB or base station) and/or conserve battery power of the UE 102 (e.g., when a remaining batter power level satisfies a power level threshold that triggers reducing power usage).

Method 200 may include, at Block 204, determining, for each of the multiple serving cells of the first RAT, a tune-away metric based on one or more performance impact factors associated with the serving cell being tuned away. In an aspect, for example, tune away metric determining component 144 (e.g., in conjunction with memory 130 and/or processor(s) 120) may determine a tune-away metric (e.g., according to prioritization or tune-away rules) for each serving cell (e.g., PCell and one or more SCells) of access point 105-a in response to the detecting, by the tune away detecting component 142, that at least one of the radio resources 150 should be tuned away. Additionally or alternatively, in an aspect, tune away metric determining component 144 may determine a tune-away metric (e.g., according to prioritization or tune-away rules) for each serving cell of access point 105-a in response to determining that a secondary timing advance group (STAG) configuration is changed or a cross-carrier scheduling is enabled. In an aspect, the tune away metric determining component 144 may determine a tune-away metric (e.g., according to prioritization or tune-away rules) for each serving cell of access point 105-a based on one or more performance impact factors associated with such cell being tuned away.

In one example of determining a tune-away metric of each cell, referring to FIG. 3, tune away metric determining component 144 may determine a tune-away metric for a cell in accordance with prioritization or tune-away rules that define a priority scheme where existence of one of a set of differently-prioritized performance impact factors associated with tuning away a cell provides a relative ranking of performance impact factors for choosing the respective cell for tuning away. In other words, in this aspect, the priority scheme essentially provides a relative ranking of the cells based on a performance impact factor associated with the cell. In an aspect, the operation of method 200 (FIG. 2) in determining a tune-away metric for each cell (e.g., FIG. 2, Block 204) using the priority scheme may include assigning a priority (e.g., a priority value) to each performance impact factor 304 associated with tuning away from a cell 302, determining that a serving cell of UE 102 corresponds to a particular performance impact factor 304, and setting the tune-away metric 306 equal to the priority value assigned to the particular performance impact factor 304.

For instance, in this example, in an aspect where a plurality of performance impact factors 304 are defined, the tune away metric determining component 144 may assign or otherwise obtain a highest tune away metric 306 in the form of a priority value such as but not limited to a value of '6' to a performance impact factor 304 such as a complete loss of LTE connectivity caused by tuning away from a PCell. For example, in an aspect, tune away metric determining component 144 may make the assignment or obtain the priority value based on accessing carrier-specific configuration information (e.g., which may be preconfigured and/or updated over-the-air by, for instance, an operator of the network) stored by modem services component 140. Similar relative rankings/priorities may be associated with other performance impact factors 304. For instance, the tune away metric determining component 144 may assign tune away metric 306 in the form of a priority value such as but not limited to a value of '5' to a performance impact factor 304 such as a complete loss of uplink (UL) transmissions caused by tuning away from a SCell with UL carrier aggregation, tune away metric 306 in the form of a priority value such as but not limited to a value of '4' to a performance impact factor 304 such as a complete loss of all SCells scheduled by a SCell caused by tuning away from the SCell with cross-carrier scheduling, tune away metric 306 in the form of a priority value such as but not limited to a value of '3' to a performance impact factor 304 such as a partial loss of UL transmission caused by tuning away from a SCell with UL timing reference, tune away metric 306 in the form of a priority value such as but not limited to a value of '2' to a performance impact factor 304 such as a loss of eMBMS caused by tuning away from a SCell with eMBMS, and a lowest tune away metric 306 in the form of priority value such as but not limited to a value of '1' to a performance impact factor 304 such as fewer glitches on a PCell caused by tuning away from a SCell sharing a single receive chain with a PCell. It is to be appreciated that the tune away metrics 306 in the form of priority values assigned to each of the performance impact factors 304 caused by tuning away from a serving cell may be changed (e.g., by a network operator or other party that provides carrier-specific configuration information to UE 102 or modem services component 140) depending on a goal of the tune-away procedure (e.g., maintaining LTE connectivity and/or maximizing LTE throughput). Moreover, the tune away metrics 306 in the form of priority values may be stored in memory 130 and statically, semi-statically, and/or dynamically assigned by the tune-away metric determining component 144.

Further, in this example, tune away metric determining component 144 may determine a corresponding performance impact factor 304 for each cell serving UE 102, e.g., in order to determine a relative ranking of the cells for tuning away. For example, in an aspect, tune away metric determining component 144 may determine the corresponding performance impact factor 304 for each cell based on accessing carrier-specific configuration information that identifies one or more performance impact factors associated with each cell. In an example, UE 102 may be served by a PCell, a SCell with uplink timing reference (e.g., SCell1), and an SCell with eMBMS (e.g., SCell2) of access point 105-a. In this example, a first receiver RX1 152 and a first transmitter TX1 154 may be tuned to uplink and downlink component carriers of the PCell (UL PCC and DL PCC), a second receiver (e.g., one of RXn 156) and/or a second transmitter (e.g., one of TXn 158) may be tuned downlink and/or uplink component carriers of SCell1 (DL SCC-1 and/or UL SCC-1), and a third receiver (e.g., one of RXn 156) and/or a third transmitter (e.g., one of TXn 158) may be tuned to downlink and/or uplink component carriers of SCell2 (DL SCC-2 and/or UL SCC-2). In this case, the tune-away metric determining component 144 may determine that the performance impact factor 304 associated with tuning away the first receiver RX1 152 and the first transmitter TX1 154 from UL PCC and DL PCC is complete loss of LTE connectivity, the performance impact factor 304 associated with tuning away the second receiver and/or the second transmitter from DL SCC-1 and/or UL SCC-1 is partial loss of UL data, and the performance impact factor 304 associated with tuning away the third receiver and/or the third transmitter from DL SCC-2 and/or UL SCC-2 is loss of eMBMS.

As such, in this case of prioritization or tune-away rules that include assigning relative priorities, tune away metric determining component 144 may then set a tune-away metric 306 and hence a corresponding rank 308 of a serving cell of UE 102 equal to the priority value assigned to the particular performance impact factor 304. Referring to the example described above, the tune away metric determining component 144 may set the tune-away metric 306 and rank 308 of the PCell equal to the priority value assigned to complete loss of LTE connectivity (e.g., '6'). The tune away metric determining component 144 may set the tune-away metric 306 and rank 308 of the SCell1 equal to the priority value assigned to partial loss of UL transmissions (e.g., '3'). Further, the tune away metric determining component 140 may set the tune-away metric 306 and rank 308 of the SCell2 equal to the priority value assigned to loss of eMBMS (e.g., '2').

Figure 5B:
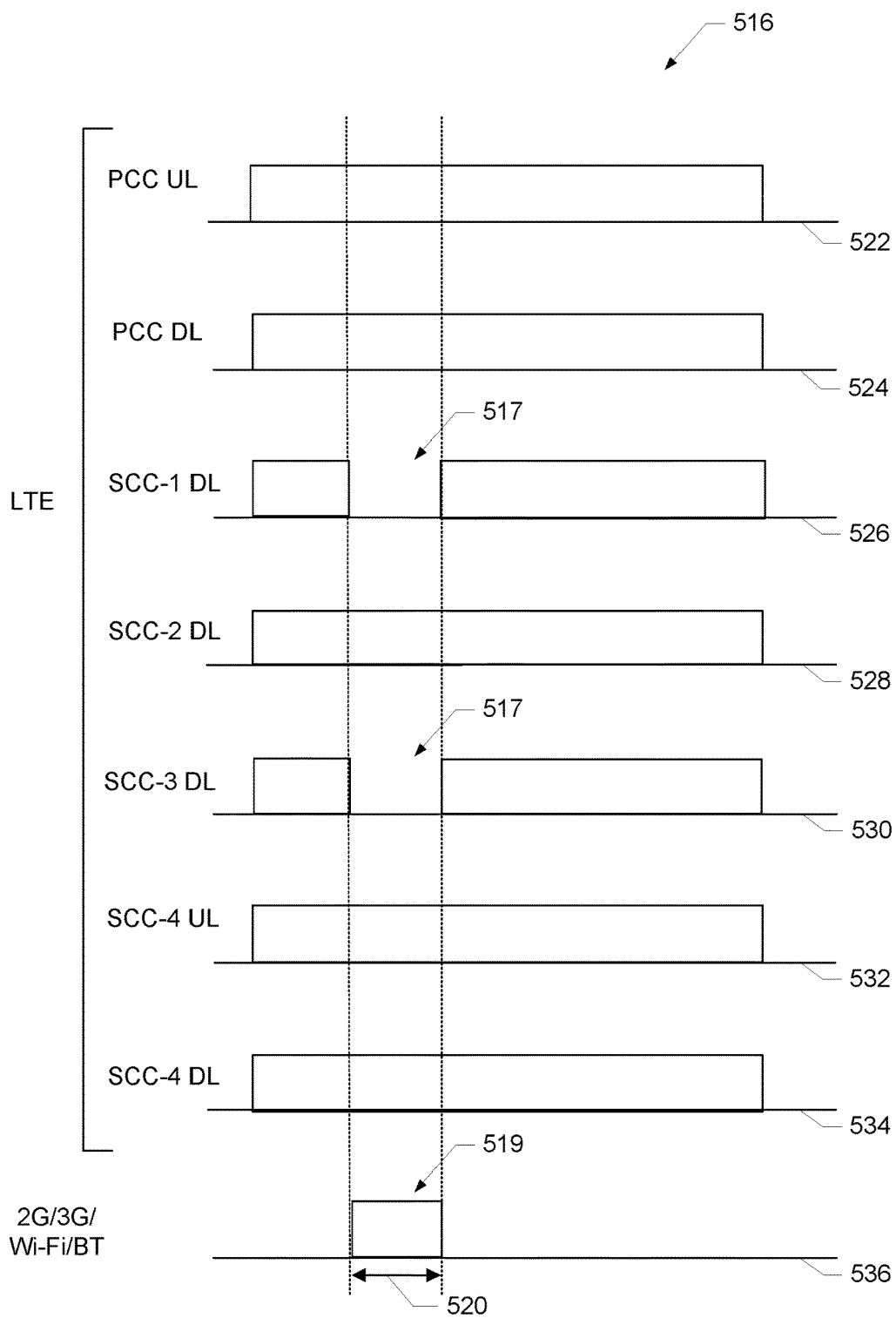
FIG. 5B is a diagram conceptually illustrating an example of performing a tune-away of the two serving cells selected according to the example illustrated in FIG. 5A.

It is noted that FIGS. 5A and 5B and their corresponding discussions provide further description and illustration of aspects having prioritization or tune-away rules that include assigning relative priorities.

Figure 4:
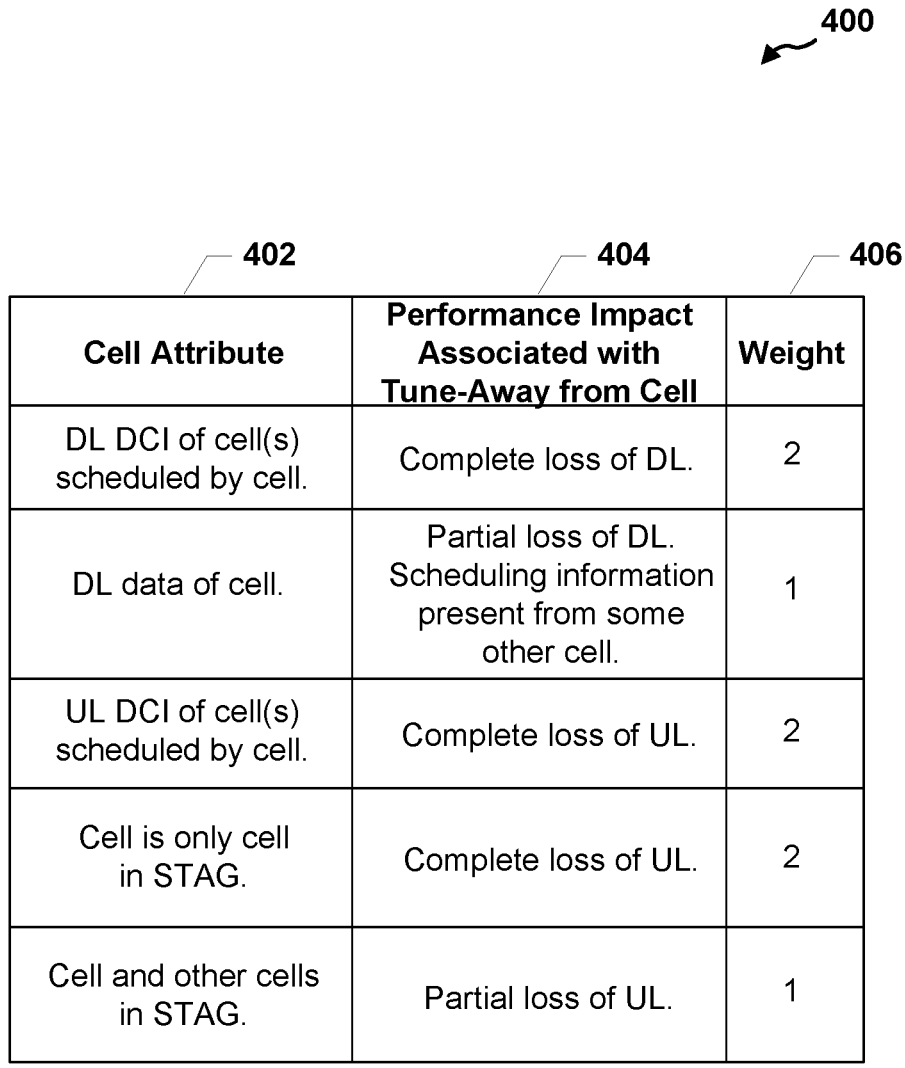
FIG. 4 is a table of an example of an aspect of one implementation of a weighted ranking scheme that may be used by a user equipment to perform a tune-away from a first RAT to a second RAT in accordance with various aspects of the present disclosure.

In an additional (or alternative) example, referring to FIG. 4, the tune away metric determining component 144 may determine a tune-away metric for a serving cell of UE 102 in accordance with prioritization or tune-away rules that include a weighting scheme that may relatively rank the cells based on accumulating one or more factors associated with each cell. In an aspect, the operation of method 200 (FIG. 2) in determining a tune-away metric for each cell (e.g., FIG. 2, Block 204) using the weighting scheme may include assigning a weight 406 to each performance impact factor 404 associated with tuning one or more radio resources 150 away from a serving cell 402, and combining all of the weights 406 of the performance impact factors 404 to determine the tune-away metric of the serving cell. For example, in an aspect, tune away metric determining component 144 may determine the tune-away metric for each serving cell based on accessing carrier-specific configuration information that identifies a particular weighting scheme, e.g., with each weight value of a set of weight values corresponding to one performance impact factor of a set of performance impact factors, to utilize for ranking or prioritizing carriers for tune-away. It is to be appreciated that the weight assignments described herein are for illustrative purposes and that other weighting schemes may also be applied. For example, it is to be appreciated that the weights 406 assigned to each of the performance impact factors 404 may be changed depending on a goal of the tune-away procedure (e.g., maintaining LTE connectivity and/or maximizing LTE throughput). Moreover, the weight assignments may be stored in memory 130 and statically, semi-statically, and/or dynamically assigned by the tune-away metric determining component 144.

In an aspect, the tune away metric determining component 144 may assign, based on a given weighting scheme, a weight 406 having a value such as but not limited to '2' to performance impact factor 404 of a complete loss of DL or UL data caused by tuning one or more radio resources 150 away from a serving cell that carries scheduling information (e.g., DL or UL downlink control information (DCI)) for itself. In an aspect, a serving cell of UE 102 may also be configured to carry cross-scheduling information for one or more other serving cells. In an aspect, the tune away metric determining component 144 may determine that a serving cell is configured to carry cross-scheduling information for one or more other serving cells. For example, tune away metric determining component 144 may make this determination by accessing carrier-specific configuration information stored by modem services component 140 and identifying this performance impact factor as being associated with a particular cell. Accordingly, the tune away metric determining component 144 may accumulate the weights, over all such other serving cells, associated with tuning one or more radio resources 150 away from the serving cell configured to carry cross-scheduling information.

For example, a SCell may schedule DL DCI for itself and 'n' (where 'n' is a positive value) other SCells. In this example, the tune away metric determining component 144 may utilize a weighting scheme defined by prioritization or tune-away rules that includes multiplying the weight assigned to the loss of DL DCI (e.g., '2') by 'n' to determine the tune-away metric of the SCell (e.g., '2' multiplied by 'n'). Similarly, a SCell may schedule UL DCI for itself and 'n' other SCells. In this case, the tune away metric determining component 144 may apply weighting scheme to multiply the weight (e.g., '2') associated with the loss of UL DCI by 'n' to determine the tune-away metric of the SCell (e.g., '2' multiplied by 'n').

In an aspect of operating the above-noted weighting scheme, the tune away metric determining component 144 may assign a weight 406 having a value such as but not limited to '1' to performance impact factor 404 of a partial loss of downlink data caused by tuning one or more radio resources 150 away from a serving cell that transmits downlink data and does not schedule DL and/or UL DCI for itself or for other cells.

Further, in an aspect of operating the above-noted weighting scheme, the tune away metric determining component 144 may assign a weight 406 having a value such as but not limited to '2' to performance impact factor 404 of a complete loss of uplink data caused by tuning one or more radio resources 150 away from a serving cell that is the only serving cell in a secondary timing advance group (STAG). In this case, tuning one or more radio resources 150 away from a serving cell that is the only serving cell in a STAG may result in a complete loss of timing reference and consequently complete loss of uplink data.

Additionally, in an aspect of operating the above-noted weighting scheme, the tune away metric determining component 144 may assign a weight 406 having a value such as but not limited to '1' to performance impact factor 404 of a partial loss of uplink data caused by tuning one or more radio resources 150 away from a serving cell that is not the only serving cell in a STAG. Here, the weight value may be reduced relative to a complete loss situation as the radio resources 150 may still obtain the timing reference from other serving cells in the STAG. In this case, the tune away metric determining component 144 may assign the weight of '1' or, alternatively, assign a weight '1' divided by 'p' if the weighting scheme utilizes partial weights.

Figure 6B:
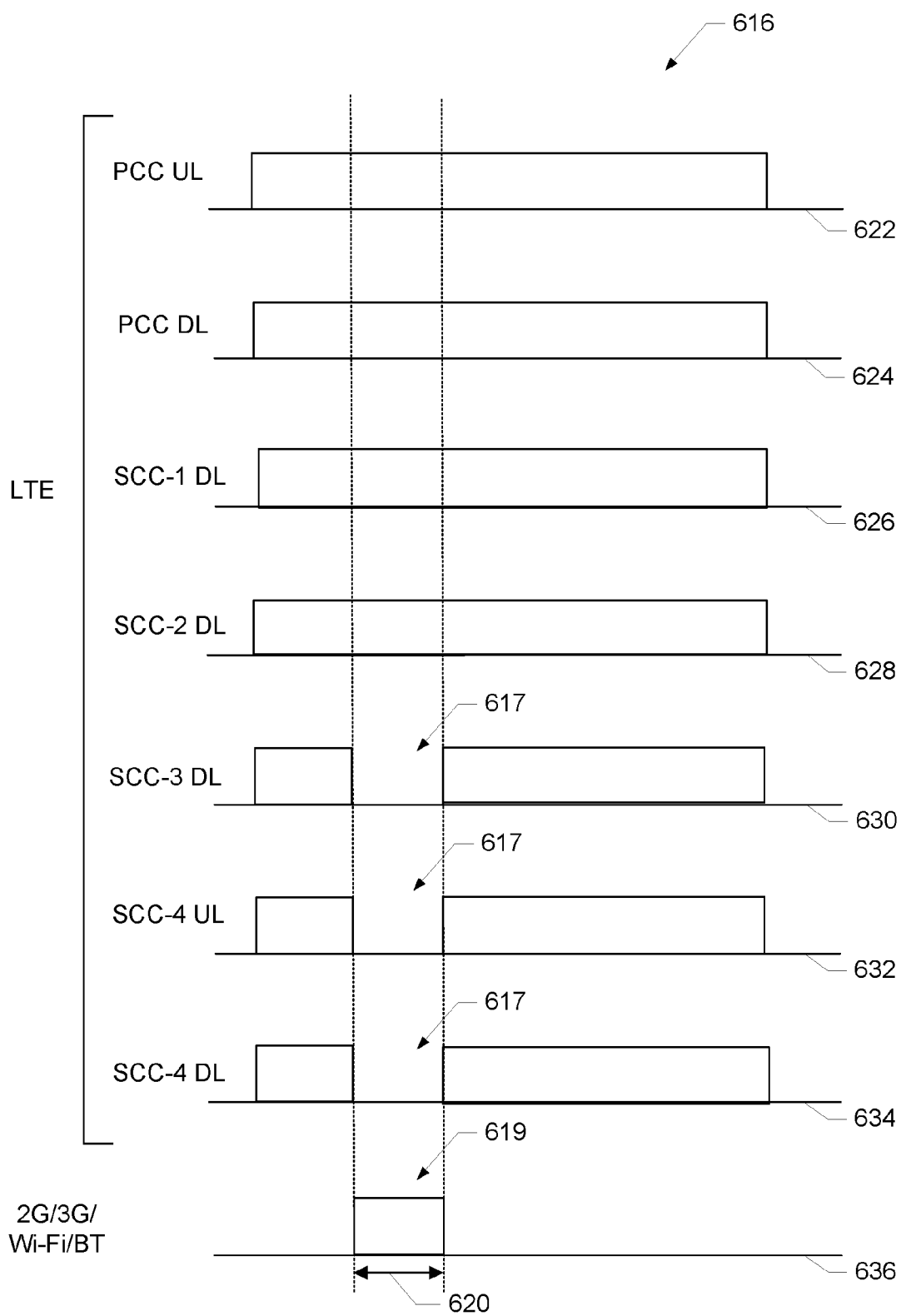
FIG. 6B is a diagram conceptually illustrating an example of performing a tune-away of the two serving cells selected according to the example illustrated in FIG. 6A.

It is noted that FIGS. 6A and 6B and their corresponding discussions provide further description and illustration of aspects having prioritization or tune-away rules that include examples of the above-noted weighting scheme.

It should be noted that many other weighting schemes may be utilized. For example, in some aspects, in a case where 'p' serving cells may be in the STAG, the weight assignment scheme may repeat the weight assignment 'p' times. So, if 'p' serving cells are in the STAG, the tune away metric determining component 144 may repeat a weight assignment for each serving cell to generate 'p' sets of weights. For each repetition, the tune away metric determining component 144 may assume that only one serving cell of the 'p' serving cells provides an uplink timing reference at a time (e.g., only one serving cell is in the STAG at a time). For example, if two SCells (e.g., SCell1 and SCell2) are in a STAG and a third SCell is not in the STAG, the tune away metric determining component 144 may generate a first set of weights by assigning weights 406 to each of the performance impact factors 404 associated with tuning one or more radio resources 150 of UE 102 away from SCell1, SCell2, and SCell3, assuming that only SCell1 provides the uplink timing reference. The tune away metric determining component 144 may generate a second set of weights by repeating the weight assignment for SCell1, SCell2, and SCell3, assuming that only SCell2 provides the uplink timing reference. As will be described herein, the tune away metric determining component 144 may determine first tune-away metrics of SCell1, SCell2, and SCell3 by combining (e.g., summing) weights of the first set of weights, and may determine second tune-away metrics of SCell1, SCell2, and SCell3 by combining (e.g., summing) weights of the second set of weights. In an aspect, as will be described herein, the radio resource selecting component 146 may select at least one cell of the serving cells from which to tune away based on a first ranking of the first tune-away metrics and a second ranking of the second tune-away metrics. For example, in an aspect, the radio resource selecting component 146 may select to tune away from a serving cell having a least amount of impact on performance according to the first ranking, and may, additionally, select to tune away from a serving cell having a least amount of impact on performance according to the second ranking.

Further, in an aspect, the tune away metric determining component 144 may combine (e.g., sum) all of the weights of each performance impact factor associated with a serving cell to determine the tune-away metric of the serving cell. For example, referring to FIG. 5A, one or more receivers of radio resources 150 may be tuned to downlink component carriers of four serving SCells (SCell1 510, SCell2 512, SCell3 514, SCell4 516). In this example, each serving cell may have the following attributes 504: SCell1 510 may schedule its own DL DCI, SCell2 512 may schedule its own DL DCI as well as DL DCI for SCell3 514 and SCell4 516, SCell3 may receive downlink data, and SCell4 516 may be the only cell in a STAG. In accordance with the weighting scheme described above with respect to FIG. 4, the tune away metric determining component 144 may assign a weight of '2' to the performance impact factor 404 associated with the loss of DL DCI of SCell1 510 caused by tuning one or more receivers of radio resources 150 away from SCell1 510, and determine that the tune-away metric 506 of SCell1 510 equals the value of the weight (e.g., '2'). Moreover, a weight of '2' multiplied by a factor '3' (based on the number of cells affected by the loss) may be assigned to the performance impact factor 404 associated with the loss of DL DCI of SCell 2 512, SCell3 514, and SCell4 512 caused by tuning one or more receivers of radio resources 150 away from SCell2 512, and a weight of '2' may be assigned to the performance impact factor associated with the loss of UL DCI of SCell4 516 caused by tuning one or more receivers of radio resources 150 away from SCell2 512. In this case, the tune away metric determining component 144 may sum all of the weights associated with SCell2 512 to determine that the tune-away metric 506 of SCell2 512 equals eight (e.g., 2*3+2). Further, a weight of '1' may be assigned to the performance impact factor 404 associated with the loss of DL data caused by tuning one or more receivers of radio resources 150 away from SCell3 514, and the tune-away metric 506 of SCell3 514 may be determined to be equal to the value of the weight (e.g., '1'). Additionally, a weight of '1' may be assigned to the performance impact factor 404 associated with the loss of DL data caused by tuning one or more receivers away from SCell4 516, and a weight of '2' may be assigned to the performance impact factor 404 associated with the loss of timing reference caused by tuning one or more receivers of radio resources 150 away from SCell4 516. In this case, the tune away metric determining component 144 may sum all of the weight values associated with SCell4 516 to determine that the tune-away metric 506 of SCell4 516 equals 3 (e.g., 1+2).

In another example, referring to FIG. 6A, one or more receivers of radio resources 150 may be tuned to downlink component carriers of four serving SCells (SCell1 608, SCell2 610, SCell3 612, SCell4 614). In this example, each serving cell may have the following attributes 602: SCell1 608 may schedule its own DL DCI and be in a STAG with SCell4 614, SCell2 610 may schedule its own DL DCI as well as DL DCI for SCell3 612 and SCell4 614, SCell3 612 may receive downlink data, and SCell4 614 may receive downlink data and be in the STAG with SCell1 608. In accordance with the weighting scheme described above with respect to FIG. 4, the tune away metric determining component 144 may assign a weight of '2' to the performance impact factor 404 associated with the loss of DL DCI of SCell1 608 caused by tuning one or more receivers of radio resources 150 away from SCell1 608, and a weight of '1' may be assigned to the performance impact factor 404 associated with the partial loss of timing reference caused by tuning one or more receivers away from SCell1 608. In this case, the tune away metric determining component 144 may sum all of the weights associated with SCell1 608 to determine that the tune-away metric 604 of SCell1 608 equals 3 (e.g., 1+2). Moreover, a weight of '2' multiplied by a factor '3' (based on the number of cells affected by the loss) may be assigned to the performance impact factor associated with the loss of DL DCI of SCell2 610, SCell3 612, and SCell4 614 caused by tuning one or more receivers of radio resources 150 away from SCell2 610, and a weight of '2' may be assigned to the performance impact factor 404 associated with the loss of UL DCI of SCell4 610 caused by tuning one or more receivers of radio resources 150 away from SCell2 610. In this case, the tune away metric determining component 144 may sum all of the weights associated with SCell2 610 to determine the tune-away metric 604 of SCell2 610 equals eight (i.e., 2*3+2). Further, the tune away metric determining component 144 may assign a weight of '1' to the performance impact factor 404 associated with the loss of downlink data caused by tuning one or more receivers of radio resources 150 away from SCell3 612, and determine that the tune-away metric 604 of SCell3 612 equals the value of the weight (e.g., '1'). Additionally, the tune away metric determining component 144 may assign a weight of '1' to the performance impact factor 404 associated with the loss of downlink data caused by tuning one or more receivers of radio resources 150 away from SCell4 614, and a weight of '1' may be assigned to the performance impact factor associated with the partial loss of timing reference caused by tuning one or more receivers away from SCell4 614. In this case, the tune away metric determining component 144 may sum all of the weights associated with SCell4 614 to determine that the tune-away metric 604 of SCell4 614 equals 2 (e.g., 1+1).

Referring back to FIG. 2, after determining the respective tune-away metric for each cell, method 200 may include, at Block 206, selecting at least one serving cell of the multiple serving cells to be tuned away based on the determined tune-away metrics of each of the multiple serving cells. In an aspect, radio resource selecting component 146 (e.g., in conjunction with memory 130 and/or processor(s) 120) may select one or more radio resources 150 to tune away from at least one serving cell of access point 105-*a*. In an aspect, the radio resource selecting component 146 may select the one or more radio resources 150 to tune away based on the respective value of each tune-away metric, and/or by ranking each of the SCells of access point 105-*a* according to the tune-away metrics determined by the tune away metric determining component 144, and selecting the serving cell with a least amount of impact on performance according to the value of the corresponding tune-away metric and/or ranking (e.g., if a relatively higher value relates to a relatively higher potential amount of performance impact, e.g., a relatively more debilitating affect on communications, then a cell having the lowest value is selected to reduce the impact during the tune-away). It is to be appreciated that the radio resource selecting component 146 may generally strive to maintain communications with a PCell, although in some aspects radio resource selecting component 146 may select to tune one or more radio resources 150 away from a PCell when all of the radio resources 150 have already been tuned away from each of the serving SCells. In this case, however, tuning one or more radio resources 150 away from the PCell would result in complete loss of LTE connectivity.

For example, referring again to the example of FIG. 5A, the radio resource selecting component 146 may rank the serving cells in an order based on the relative value of the corresponding tune-away metric 506. In this case, radio resource selecting component 146 may rank the serving cells in the following order 508: SCell3 514, SCell1 510, SCell4 516, and SCell2 512, where SCell3 514 has the least potential amount of impact on performance and SCell2 512 has the greatest potential impact on performance based on the values of the determined tune-away metrics. The radio resource selecting component 146 may, for example, select one or more serving cells from which to tune away, e.g., depending on the detected need to tune away (for instance, based on a use case of the RAT to which the UE 102 should be tuned). As such, if the UE 102 only detects a need to tune away from a single serving cell, then radio resource selecting component 146 will select to tune one or more radio resources 150 away from the serving cell having the least performance impact, e.g., in this case, SCell3 514 having the rank of "1." In an example where the detected need to tune away requires two serving cells from which to tune away, the radio resource selecting component 146 may select one or more radio resources 150 communicating with SCell3 514 having rank value of "1" and SCell1 510 having rank value of "2" to tune away from access point 105-a as they have the least amount of impact on performance according to the ranking. It is to be appreciated that the radio resource selecting component 146 may select any number of serving cells to tune away based on a need detected by the tune away detecting component 142.

In another example, referring again to FIG. 6A, the radio resource selecting component 146 may rank the serving cells in the following order 606: SCell3 612, SCell4 614, SCell1 608, and SCell2 610, where SCell3 612 has the least potential amount of impact on performance and SCell2 610 has the greatest potential impact on performance based on the values of the determined tune-away metrics. For illustration purposes, the radio resource selecting component 146 may, for example, select two serving cells from which to tune away. In this example, the radio resource selecting component 146 may select one or more radio resources 150 communicating with SCell3 612 having rank value of "1" and SCell4 614 having rank value of "2" to tune away from access point 105-a as they have the least amount of impact on performance according to the ranking. Again, it is to be appreciated that the radio resource selecting component 146 may select any number of serving cells to tune away based on the need detected by the tune away detecting component 142.

In an aspect, the radio resource selecting component 146 may perform a tie-breaker procedure to resolve ties in the ranking by implementing a combination of the priority scheme described above with regard to FIG. 3 and the weighting scheme described above with regard to FIG. 4, or by randomly selecting between ties. For example, in an aspect, if there is a tie in the order of the ranking based on the weighting scheme, then the radio resource selecting component 146 may perform a tie-breaker by further ranking the tied serving cells based on the priority scheme. For example, referring again to FIG. 3, the radio resource selecting component 146 may rank 308 each of the tied serving cells in order from lowest to highest priority value as represented by tune-away metric 306, where the serving cell with the lowest priority value corresponds to the serving cell that will cause the least amount of impact on performance if one or more radio resources 150 are tuned away from the serving cell. Alternatively or additionally, the radio resource selecting component 146 may resolve ties by assigning serving cells in a STAG that also receive downlink data a higher priority value than serving cells in a STAG that do not receive downlink data. Moreover, the radio resource selecting component 146 may assign servings cells with the most data scheduled a higher priority value than serving cells with less data scheduled. The radio resource selecting component 146 may resolve any further ties at random.

Referring back to FIG. 2, method 200 further includes, at Block 208, tuning one or more radio resources corresponding to the selected at least one serving cell away from a first RAT (e.g., access point 105-a in a LTE network) to a second RAT (e.g., access point 116 in a legacy 2G/3G network or Wi-Fi or Bluetooth network). In an aspect, tune away controller component 148 (e.g., in conjunction with memory 130 and/or processor(s) 120) may tune away one or more radio resources 150 communicating with the at least one serving cell selected by the radio resource selecting component 146. In an aspect, the tune away controller component 148 may identify one or more radio resources 150 (e.g., RX1 152, TX1 154, through RXn 156, and/or TXn 158) tuned to downlink and/or uplink component carrier(s) of the at least one selected serving cell. The tune away controller component 148 may tune the one or more identified radio resources 150 away from the downlink and/or uplink component carrier(s) of the at least one selected serving cell of access point 105-a to a carrier of a cell of access point 116.

Referring again to the example of FIG. 5A, the radio resource selecting component 146 may select one or more radio resources 150 communicating with SCell3 514 and SCell1 510 to tune away from access point 105-a to access point 116. In this example, referring to FIG. 5B, diagram 516 represents selected ones of a plurality of carriers of a first RAT (e.g., PCC UL 522, PCC DL 524, SCC-1 DL 526, SCC-2 DL 528, SCC-3 DL 530, SCC-4 UL 532, SCC-4 DL 534 of a first RAT, for instance, LTE) having their respective radio resources 150 tuned away in order to allow UE 102 to communicate with another carrier of another RAT (e.g., carrier 536 of a RAT such as, for instance, one of 2G, 3G, or Wi-Fi). In particular, in this example, the tune away controller component 148 may identify one or more receivers of radio resources 150 tuned to a downlink carrier of SCell3 514 (e.g., SCC-3 DL 530) and one or more receivers of radio resources 150 tuned to a downlink carrier of SCell1 510 (e.g., SCC-1 DL 526). In this example, the tune away controller component 148 may perform a tune away 517 of each of the identified receivers away from SCC-3 DL 530 and SCC-1 DL 526, respectively, to tune 519 to a carrier 536 of a cell of access point 116, where the tuning occurs during a time interval 520 (e.g., a time interval scheduled to perform paging).

Referring again to the example of FIG. 6A, the radio resource selecting component 146 may select one or more radio resources 150 communicating with SCell3 612 and SCell4 614 to tune away from access point 105-a to access point 116. In this example, referring to FIG. 6B, diagram 616 represents selected ones of a plurality of carriers of a first RAT (e.g., PCC UL 622, PCC DL 624, SCC-1 DL 626, SCC-2 DL 628, SCC-3 DL 630, SCC-4 UL 632, SCC-4 DL 634 of a first RAT, for instance, LTE) having their respective radio resources 150 tuned away in order to allow UE 102 to communicate with another carrier of another RAT (e.g., carrier 636 of a RAT such as, for instance, one of 2G, 3G, or Wi-Fi). In particular, in this example, the tune away controller component 148 may identify one or more receivers of radio resources 150 tuned to a downlink carrier of SCell3 612 (e.g., SCC-3 DL 630) and one or more receivers and transmitters of radio resources 150 tuned to uplink and downlink carriers of SCell4 614 (e.g., SCC-4 UL 632 and SCC-4 DL 634). In this example, the tune away controller component 148 may tune away 602 each of the identified transmitters and receivers from SCC-3 DL 630, SCC-4 UL 632, and SCC-4 DL 634, respectively, to tune 619 to a carrier 636 of a cell of access point 116, where the tuning occurs during a time interval 620 (e.g., a time interval scheduled to perform paging).

In another example that illustrates the operation of method 200 in the above-noted case where 'p' serving cells may be in the STAG and the weight assignment scheme may repeat the weight assignment 'p' times, the starting conditions may include the following: SCell 1 schedules itself, SCell 2 schedules itself as well as SCell 3 and SCell 4, SCell 4 has UL and is in a STAG along with SCell 1, and it is assumed there is a need to tune away 2 SCell DLs. In this example, a first set of weights assuming SCell 4 as timing reference is as follows: SCell 1=2 (scheduling of SCell 1 DL), SCell 2=8 (scheduling of SCell 2 DL+scheduling of SCell 3 DL+scheduling of SCell 4 DL+scheduling of SCell 4 UL), SCell 3=1 (data of SCell 3 DL), and SCell 4=3 (data of SCell 4 DL+timing of SCell 4 UL). Further, in this example, a second set of weights assuming SCell 1 as timing reference: SCell 1=4 (scheduling of SCell 1 DL+timing of SCell 4 UL), SCell 2=8 (scheduling of SCell 2 DL+scheduling of SCell 3 DL+scheduling of SCell 4 DL+scheduling of SCell 4 UL), SCell 3=1 (data of SCell 3 DL), and SCell 4=1 (data of SCell 4 DL). Thus, according to the operation of the present aspects in the case where 'p' serving cells may be in the STAG and the weight assignment scheme may repeat the weight assignment 'p' times, modem services component 140 may produce a tune-away result using the above weightings such that that SCell 3 and SCell 4 are removed, considering the least value of both sets, and timing of SCell 4 UL is derived from SCell 1.

It is to be appreciated that the method 200 described above with respect to FIG. 2, FIG. 3, FIG. 4, FIGS. 5A-5B, and FIGS. 6A-6B may also be extended to a multiple connectivity scenario. That is, the modem services component 140 may (e.g., in conjunction with processor(s) 120 and/or memory 130) select one or more radio resources 150 to tune away from LTE serving cells when radio resources 150 are utilized by UE 102 to communicate with both access point 105-*a* and access point 105-*b* over multiple carriers. In an aspect, access point 105-*a* may be a master eNB and access point 105-*b* may be a secondary access point 105-*b*. In this case, a group of serving cells associated with access point 105-*a* may be a master carrier (or cell) group (MCG) of cells and a group of serving cells associated with access point 105-*b* may be a secondary carrier (or cell) group (SCG) of cells. PCell may be the primary cell on the master cell group, and PSCell may be the primary cell on the secondary cell group. The master cell group and secondary cell group may each include one or more SCells. The modem services component 140 may select one or more radio resources 150 to tune away from at least one SCell of the MCG and/or the SCG according to the method 200 described above. Moreover, the modem services component 140 may assign a greater weight and/or priority value to a SCell from the MCG than a SCell from the SCG. Further, the modem services component 140 may tune one or more radio resources 150 away from the PSCell when each of the radio resources 150 has already been tuned away from all of the SCells. The modem services component 140 may tune one or more radio resources 150 away from the PCell when each of the radio resources 150 has already been tuned away from the PSCell and all of the SCells.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of performing a tune-away from a first radio access technology (RAT) to a second RAT on a user equipment (UE), comprising:
   detecting, by the UE, a need to tune away at least one of multiple radio resources utilized by the UE to communicate with multiple serving cells of the first RAT;

determining, for each of the multiple serving cells, a
tune-away metric based on one or more performance
impact factors associated with the serving cell being
tuned away;
selecting at least one serving cell of the multiple serving
cells to be tuned away based on the determined tune-
away metrics of each of the multiple serving cells; and
tuning one or more radio resources corresponding to the
selected at least one serving cell away from the first
RAT to the second RAT.

2. The method of claim 1, further comprising:
ranking the multiple serving cells according to the determined tune-away metrics; and
wherein the selecting comprises:
selecting the at least one serving cell having a least
amount of impact on performance according to the
ranking.

3. The method of claim 1, wherein the determining the tune-away metric for each of the multiple serving cells further comprises:
assigning a weight to each of the one or more performance impact factors; and
combining all the weights of the one or more performance impact factors associated with each of the multiple serving cells to determine the tune-away metric of each of the multiple serving cells.

4. The method of claim 3, further comprising:
determining that a respective serving cell is configured to carry cross-scheduling information for one or more other serving cells of the multiple serving cells; and
accumulating weights, over all the one or more other serving cells, associated with downlink or uplink data loss of the one or more other serving cells caused by loss of the cross-scheduling information carried by the respective serving cell.

5. The method of claim 1, wherein the determining the tune-away metric for each of the multiple serving cells further comprises:
assigning a priority to each of the one or more performance impact factors;
determining that a respective serving cell corresponds to a particular performance impact factor, and
setting the tune-away metric for the respective serving cell to be the priority assigned to the particular performance impact factor.

6. The method of claim 1, wherein the determining the tune-away metric for each of the multiple serving cells is further performed in response to determining that a secondary timing advance group (STAG) configuration is changed or a cross-carrier scheduling is enabled.

7. The method of claim 1, wherein the multiple serving cells comprise a primary cell (PCell) and at least one secondary cell (SCell) of the first RAT, or a master carrier group of cells and a second carrier group of cells.

8. The method of claim 1, wherein the one or more performance impact factors comprise at least one of scheduling information loss, data loss, timing reference loss, or broadcast or multicast service loss, due to a respective serving cell being tuned away.

9. The method of claim 1, wherein the detecting comprises:
determining that at least one cell of the multiple serving cells should be tuned away to satisfy thermal regulations or to conserve battery power.

10. An apparatus for performing a tune-away from a first radio access technology (RAT) to a second RAT, comprising:

a memory configured to store instructions; and
one or more processors communicatively coupled to the memory, the one or more processors configured to execute the instructions to:
detect a need to tune away at least one of multiple radio resources utilized by the apparatus to communicate with multiple serving cells of the first RAT;
determine, for each serving cell of the multiple serving cells, a tune-away metric based on one or more performance impact factors associated with the serving cell being tuned away;
select at least one serving cell of the multiple serving cells to be tuned away based on the determined tune-away metrics of each of the multiple serving cells; and
tune one or more radio resources corresponding to the selected at least one serving cell away from the first RAT to the second RAT.

11. The apparatus of claim 10, wherein one or more processors are further configured to:
rank the multiple serving cells according to the determined tune-away metrics; and
wherein to select the at least one serving cell of the multiple serving cells to be tuned away, the one or more processors are further configured to:
select the at least one serving cell having a least amount of impact on performance according to the ranking.

12. The apparatus of claim 10, wherein to determine the tune-away metric for each of the multiple serving cells, the one or more processors are further configured to:
assign a weight to each of the one or more performance impact factors; and
combine all the weights of the one or more performance impact factors associated with each of the multiple serving cells to determine the tune-away metric of each of the multiple serving cells.

13. The apparatus of claim 12, wherein the one or more processors are further configured to:
determine that a respective serving cell is configured to carry scheduling information for one or more other serving cells of the multiple serving cells; and
accumulate weights, over all of the one or more other serving cells, associated with downlink or uplink data loss of the one or more other serving cells caused by loss of the cross-scheduling information carried by the respective serving cell.

14. The apparatus of claim 10, wherein to determine the tune-away metric for each of the multiple serving cells, the one or more processors are further configured to:
assign a priority to each of the one or more performance impact factors;
determine that a respective serving cell corresponds to a particular performance impact factor, and
set the tune-away metric for the respective serving cell to be the priority assigned to the particular performance impact factor.

15. The apparatus of claim 10, wherein to determine the tune-away metric for each of the multiple serving cells, the one or more processors are further configured to:
determine the tune-away metrics in response to determining that a secondary timing advance group (STAG) configuration is changed or a cross-carrier scheduling is enabled.

16. The apparatus of claim 10, wherein the multiple serving cells comprise a primary cell (PCell) and at least one secondary cell (SCell) of the first RAT, or a master carrier group of cells and a second carrier group of cells.

17. The apparatus of claim 10, wherein the one or more performance impact factors comprise at least one of scheduling information loss, data loss, timing reference loss, or broadcast or multicast service loss, due to a respective serving cell being tuned away.

18. The apparatus of claim 10, wherein to detect a need to tune away the at least one of the multiple radio resources, the one or more processors are further configured to:
 determine that at least one of the multiple serving cells should be tuned away to satisfy thermal regulations or to conserve battery power.

19. An apparatus for performing a tune-away from a first radio access technology (RAT) to a second RAT, comprising:
 means for detecting a need to tune away at least one of multiple radio resources utilized by the apparatus to communicate with multiple serving cells of the first RAT;
 means for determining, for each of the multiple serving cells, a tune-away metric based on one or more performance impact factors associated with the serving cell being tuned away;
 means for selecting at least one serving cell of the multiple serving cells to be tuned away based on the determined tune-away metrics of each of the multiple serving cells; and
 means for tuning one or more radio resources corresponding to the selected at least one serving cell away from the first RAT to the second RAT.

20. The apparatus of claim 19, further comprising:
 means for ranking the multiple serving cells according to the determined tune-away metrics; and
 wherein the means for selecting comprises:
 means for selecting the at least one serving cell having a least amount of impact on performance according to the ranking.

21. The apparatus of claim 19, wherein the means for determining the tune-away metric for each of the multiple serving cells further comprises:
 means for assigning a weight to each of the one or more performance impact factors; and
 means for combining all the weights of the one or more performance impact factors associated with each of the multiple serving cells to determine the tune-away metric of each of the multiple serving cells.

22. The apparatus of claim 21, further comprising:
 means for determining that a respective serving cell is configured to carry cross-scheduling information for one or more other serving cells of the multiple serving cells; and
 means for accumulating weights, over all the one or more other serving cells, associated with downlink or uplink data loss of the one or more other serving cells caused by loss of the cross-scheduling information carried by the respective serving cell.

23. The apparatus of claim 19, wherein the means for determining the tune-away metric for each of the multiple serving cells further comprises:
 means for assigning a priority to each of the one or more performance impact factors;
 means for determining that a respective serving cell corresponds to a particular performance impact factor, and
 means for setting the tune-away metric for the respective serving cell to be the priority assigned to the particular performance impact factor.

24. The apparatus of claim 19, wherein the means for determining the tune-away metric for each of the multiple serving cells is further performed in response to determining that a secondary timing advance group (STAG) configuration is changed or a cross-carrier scheduling is enabled.

25. The apparatus of claim 19, wherein the multiple serving cells comprise a primary cell (PCell) and at least one secondary cell (SCell) of the first RAT, or a master carrier group of cells and a second carrier group of cells.

26. The apparatus of claim 19, wherein the one or more performance impact factors comprise at least one of scheduling information loss, data loss, timing reference loss, or broadcast or multicast service loss, due to a respective serving cell being tuned away.

27. The apparatus of claim 19, wherein the means for detecting comprises:
 means for determining that at least one of the multiple serving cells should be tuned away to satisfy thermal regulations or to conserve battery power.

28. A non-transitory computer-readable medium storing computer executable code for performing a tune-away from a first radio access technology (RAT) to a second RAT, comprising:
 code for causing a computer to:
 detect a need to tune away at least one of multiple radio resources utilized by a user equipment to communicate with multiple serving cells of the first RAT;
 determine, for each of the multiple serving cells, a tune-away metric based on one or more performance impact factors associated with the serving cell being tuned away;
 select at least one serving cell of the multiple serving cells to be tuned away based on the determined tune-away metrics of each of the multiple serving cells; and
 tune one or more radio resources corresponding to the selected at least one serving cell away from the first RAT to the second RAT.

29. The non-transitory computer-readable medium of claim 28, further comprising code for causing the computer to:
 rank the multiple serving cells according to the determined tune-away metrics; and
 wherein to select at least one serving cell of the multiple serving cells to be tuned away, the non-transitory computer-readable medium further comprises code for causing the computer to:
 select the at least one serving cell having a least amount of impact on performance according to the ranking.

30. The non-transitory computer-readable medium of claim 28, wherein to determine the tune-away metric for each of the multiple serving cells, the non-transitory computer-readable medium further comprises code for causing the computer to:
 assign a weight to each of the one or more performance impact factors; and
 combine all the weights of the one or more performance impact factors associated with each of the multiple serving cells to determine the tune-away metric of each of the multiple serving cells.

\* \* \* \* \*